United States Patent [19]

Matsui

[11] Patent Number: 5,604,876
[45] Date of Patent: Feb. 18, 1997

[54] APPARATUS FOR HANDLING DIFFERING DATA LENGTH INSTRUCTIONS USING EITHER DIRECTLY SPECIFIED OR INDIRECTLY SPECIFIED DATA LENGTHS

[75] Inventor: Satoshi Matsui, Yokohama, Japan

[73] Assignee: Fujitsu Limited, Kawasaki, Japan

[21] Appl. No.: 671,318

[22] Filed: Mar. 19, 1991

[30] Foreign Application Priority Data

Mar. 20, 1990 [JP] Japan ................................. 2-071127

[51] Int. Cl.$^6$ ....................................... G06F 9/34
[52] U.S. Cl. ................................................ 395/386
[58] Field of Search ..................... 395/375, 800

[56] References Cited

U.S. PATENT DOCUMENTS 4,586,130  4/1986  Batts, Jr. et al. .................. 395/375
4,649,477  3/1987  MacGregor et al. ................ 395/775
4,825,355  4/1989  Kurakazu et al. .................. 395/375

Primary Examiner—Richard L. Ellis
Attorney, Agent, or Firm—Armstrong, Westerman, Hattori, McLeland & Naughton

[57] ABSTRACT

An improvement of the present invention relates to a data length deciding unit of an information processing apparatus using instructions having different data length. The information processing apparatus has a compact ROM for storing microprograms. The information processing apparatus comprises a data length specifying unit for specifying either directly specified data length information or indirectly specified data length information, a storing unit for storing data length information related to a process not contained in the microprograms, a controlling unit for controlling the storing unit, and a selecting unit for selecting one of the outputs of the data length specifying unit and storing unit, and outputting the selected one.

4 Claims, 5 Drawing Sheets

APPARATUS FOR HANDLING DIFFERING DATA LENGTH INSTRUCTIONS USING EITHER DIRECTLY SPECIFIED OR INDIRECTLY SPECIFIED DATA LENGTHS

BACKGROUND OF THE INVENTION

1. Field of the Invention

The present invention relates to an information processing apparatus employing a computer, and particularly to an improvement of a data length deciding circuit of the information processing apparatus which employs instructions involving different data lengths.

2. Description of the Related Art

To improve data processing efficiency, an information processing apparatus employs instructions which operate on data of different lengths (byte length data, word length data, etc.). To correctly operate the information processing apparatus, it is necessary to correctly transfer and write instructions which operate on data whose length are proper for respective internal elements of the information processing apparatus. To decide the length of each data to be operated on by each instruction, a data length deciding circuit is employed. Recent increased functionality requirements for computer systems result in the need for high-speed decision capabilities and reduced circuit scale for the data length deciding circuit.

There are two conventional techniques for deciding the data length of an instruction. One is to directly specify the data length in the instruction program. The other is not only to directly specify the data length according to a microprogram of the instruction, but also to indirectly specify the data length according to an instruction code.

The former technique directly writes data length information of an instruction in a microprogram of the instruction. This technique expands the size of the program to increase the required capacity of a memory such as a ROM for storing the program.

The latter technique inserts a code indicating the data length of an instruction in a microprogram for the instruction itself, and stores actual data length information corresponding to the code in a separate table. When the code in the microprogram is read, an address in the table corresponding to the code is accessed to read the data length information stored at the address. This technique is not always efficient because it takes time to access the separate table.

In developing a computer, sometimes two instructions are provided which perform an identical operation on data having different lengths. The technique of directly specifying the data length of each instruction requires a microprogram for each of the two instructions. This increases the required capacity of a ROM for storing the microprograms, thereby increasing an area occupied by the ROM.

The technique of indirectly specifying a data length according to an instruction code need not require two separate microprograms for the two instructions, but a single microprogram can be used which is sufficient to express the two instructions involving two different data lengths. This technique is not applicable, however, to a process such as an interrupt process whose data length cannot be indirectly specified by an instruction code. In this case, a bit having information of the data length must be checked with, for example, an ALU (arithmetic and logic unit) to branch the microprogram. This also increases the area of the microprogram ROM and elongates a process execution state.

A typical arrangement of a conventional information processing apparatus will now be explained with reference to FIG. 1.

In the figure, an information processing apparatus 20 comprises a CPU 10, a microprogram ROM 15, a decoder 16, and a data length specifying circuit 4. The CPU 10 has a plurality of registers 13 and an ALU (arithmetic and logic unit) 14 which are connected to a data bus 11 and an address bus 12. The ALU 14 operates according to microprograms stored in the microprogram ROM 15. The data length specifying circuit 4 is connected to the microprogram ROM 15 and decoder 16 as well as to the ALU 14. The microprogram ROM 15 provides the data length specifying circuit 4 with a directly specified data length output 3. The decoder 16 indirectly specifies the data length of an instruction, for example, byte data and word data, and provides the data length specifying circuit 4 with an indirectly specified data length output 2. The data length specifying circuit 4 specifies one of the directly specified data length output 3 and indirectly specified data length output 2, and provides the ALU 14 of the CPU 10 with a data length output $D_{out}$.

For example, two bits of an instruction of a microprogram are used to represent a data length, e.g., "00" for a directly specified data length of eight bits, "01" for a directly specified data length of 16 bits, "11" for a directly specified data length of 32 bits, and "10" for an indirectly specified data length. If the code of an instruction represents any one of the directly specified data lengths, the instruction is executed as it is. If the code represents an indirectly specified data length, the decoder 16 reads the data length of the instruction from a predetermined address in a predetermined table.

Other codes may also be employed. For example, (MOV, A, d, r) for an eight-bit data length, (MOVW, A, d, r) for a 16-bit data length, and (MOVL, A, d, r) for a 32-bit data length may be used.

SUMMARY OF THE INVENTION

An object of the invention is to provide an information processing apparatus that can reduce an area occupied by a ROM for storing microprograms.

To achieve the object, an information processing apparatus according to the present invention processes information containing a plurality of instructions involving different data lengths by the use of microprograms after deciding the data length information of each of the instructions according to an indirect specifying method or a method of directly specifying the data length information in the microprograms. The apparatus comprises a data length deciding circuit 30, for specifying either the directly specified data length information or indirectly specified data length information, a storing circuit for storing data length information related to a process that is not included in the microprograms, a controlling circuit for controlling the storing circuit, and a selecting circuit for selecting one of an output of the data length specifying circuit and an output of the storing circuit, and outputting the selected one.

DESCRIPTION OF THE PREFERRED EMBODIMENTS

Figure 2:
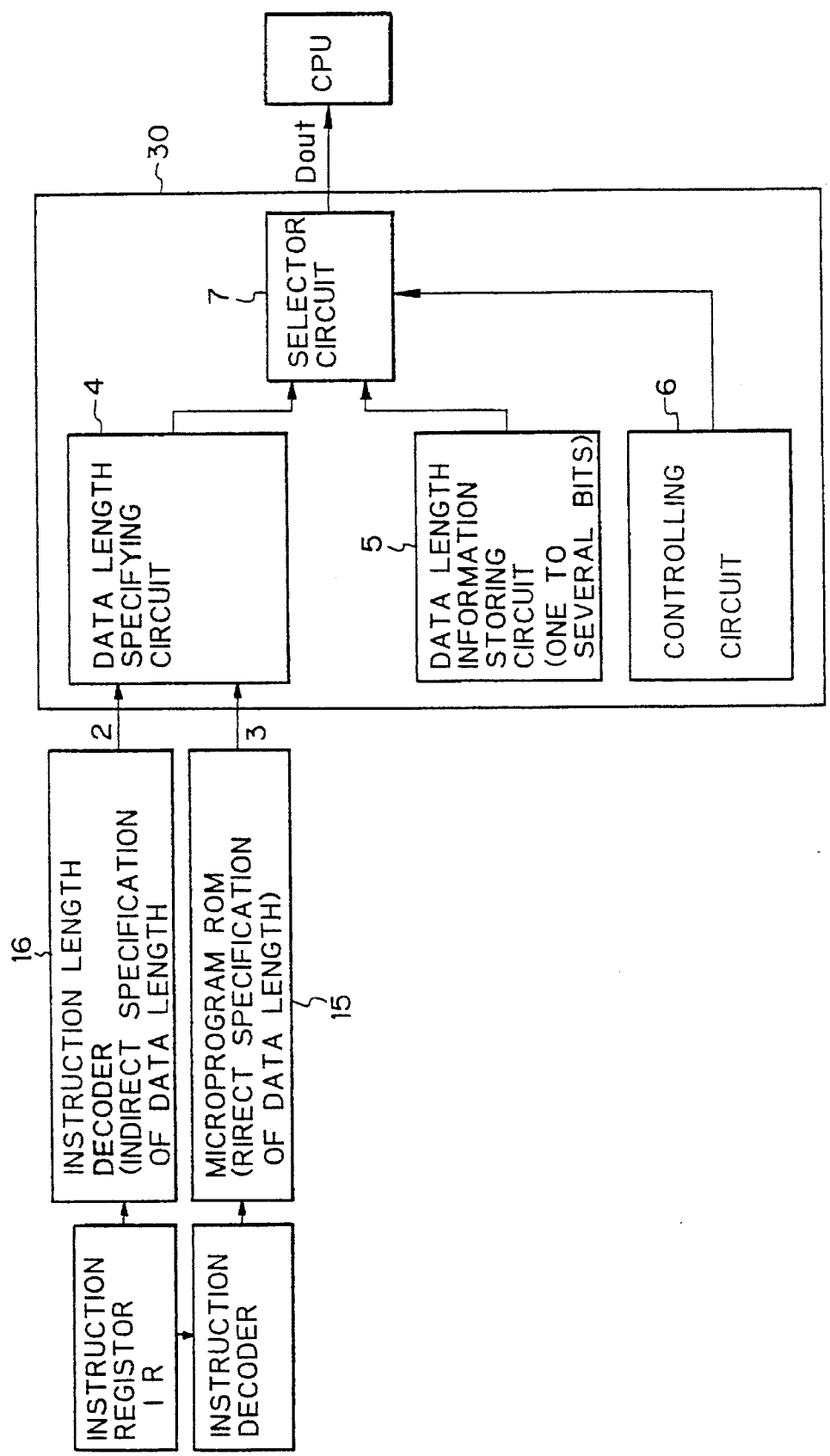
FIG. 2 is a view explaining a principle of the present invention.

FIG. 2 shows a principle of the invention. A data length deciding circuit 30 has, in addition to a conventional data length specifying circuit 4, a data length information storing circuit 5, a controlling circuit 6, and a selecting circuit 7. The data length information storing circuit 5 stores information indicating a data length related to an operation code of an instruction that is not included in original microprograms. The information stored in the storing circuit 5 is provided to the selecting circuit 7. The data length information stored in the storing circuit 5 is used in executing instructions that are not included in the microprograms. A special table is prepared separate from the microprograms to store data length information for instructions which are not included in the microprograms. The information in the table is read as and when required and used as a data length in executing one of the special instructions. These special instructions are, for example, instructions for interrupt processes.

The controlling circuit 6 reads the table as and when required and stores the read information in the storing circuit 5.

The controlling circuit 6 has an input/output portion 6–8 for transferring the data length information from the table (an external storage unit) to the storing circuit 5, and a stop portion 6–9 for stopping the provision of information from the storing circuit 5 to the selecting circuit 7.

When an IIOS (intelligent IO service) signal for example, is provided to the input/output portion 6–8 of the controlling circuit 6 to turn on the controlling circuit 6, the output of the controlling circuit 6 actuates the data length information storing circuit 5. At this time, predetermined data length information is transferred from the table (not shown) to the data length information storing circuit 5 and stored therein, and the information stored in the storing circuit 5 is provided to the selecting circuit 7.

The data length specifying circuit 4 serves as a selector having the same function as that in the conventional circuit.

In response to the output of the controlling circuit 6, the selecting circuit 7 selects one of the outputs of the data length specifying circuit 4 and data length information storing circuit 5, and provides the selected one to a central processing unit.

In a normal data process of the present invention, the data length information of an instruction is read directly from the microprograms, or indirectly from encoded information written in the microprograms. The data length specifying circuit 4 selects one of them and provides the selected one to the selecting circuit 7 and from there to the central processing unit.

To carry out a special operation process such as an interrupt process that is not included in the microprograms, the controlling circuit 6 is operated to transfer the data length information of an instruction for carrying out the special process from the data length information storing circuit 5 to the selecting circuit 7. At the same time, the controlling circuit 6 switches the selecting circuit 7 to provide the output of the storing circuit 5 to the central processing unit.

While the controlling circuit 6 is operating, the operation according to the special instruction not included in the microprograms is performed.

When an IRR signal, i.e., an operation routine end flag is provided to the stop portion 6–9 of the controlling circuit 6, the controlling circuit 6 is turned off to again switch the selecting circuit 7 so that an operation is executed with a data length related to an original instruction included in the microprograms.

EXAMPLES

Preferred embodiments of the invention will be explained next with reference to FIGS. 3 and 4.

Figure 3:
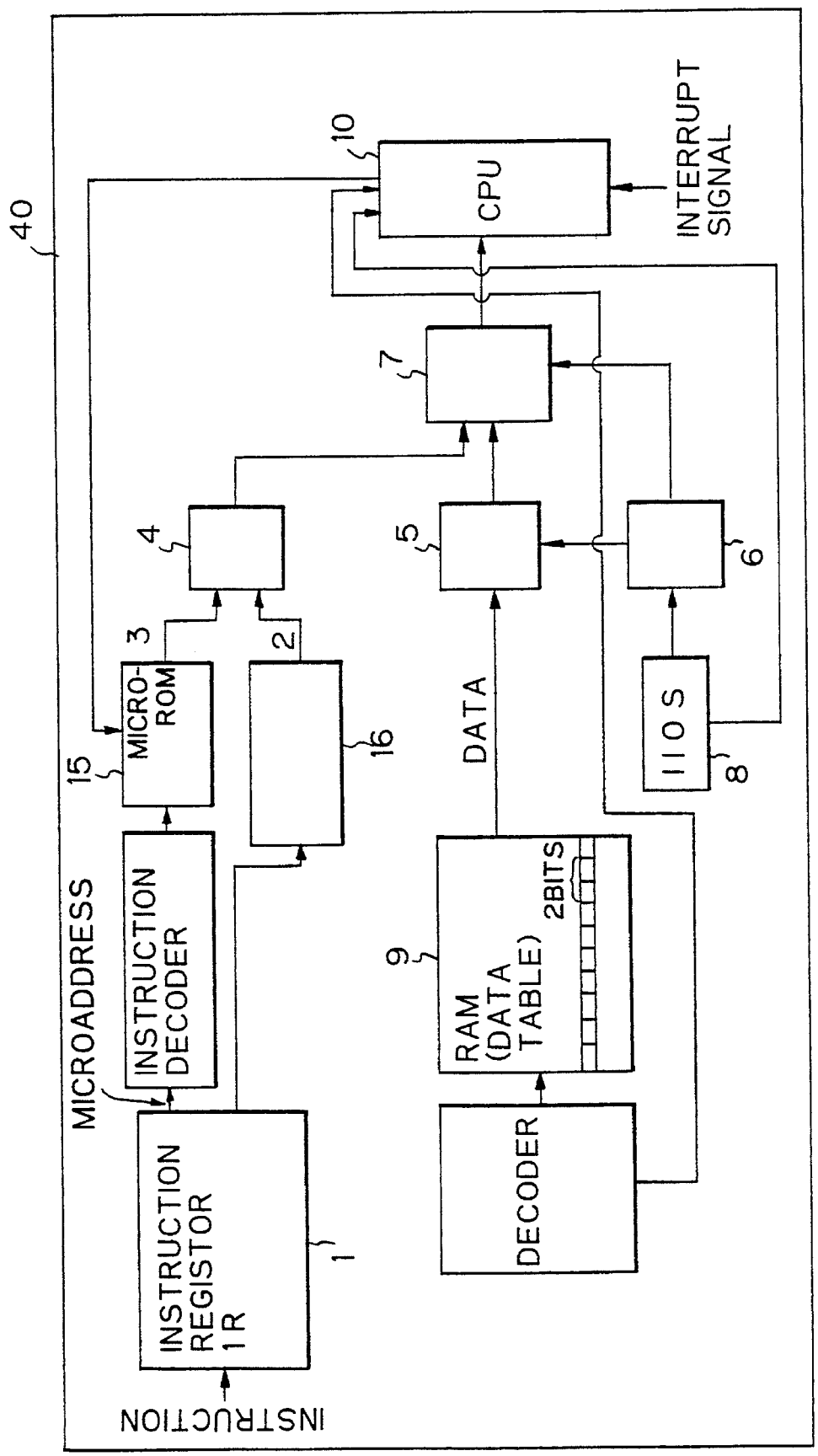
FIG. 3 is a block diagram schematically showing an information processing apparatus according to the present invention.

FIG. 3 is a block diagram schematically showing an arrangement of an information processing apparatus 40. Similar to the conventional apparatus, the data length information of an instruction is directly specified according to microprograms 1 and provided as information 3 from a ROM 15. Also, the data length information of the instruction is indirectly specified according to the microprograms 1 and provided as information 2 from a decoder 16. A data length specifying circuit 4 selects one of the information pieces 2 and 3.

A data storage unit 9 is, for example, a memory table for storing a plurality of pieces of data length information necessary for executing instructions that are not included in the microprograms. A data length information storing circuit 5 selectively stores the data length information stored in the data storage unit 9. A control signal storage unit 8 stores signals such as an IIOS signal for carrying out an interrupt process. A controlling circuit 6 operates according to a control signal selected from those stored in the control signal storage unit 8 to actuate the data length information storing circuit 5 and switch a selecting circuit 7.

In response to an output signal from the controlling circuit 6, the data length information storing circuit 5 reads predetermined data from the data storage unit 9 and provides the same to the selecting circuit 7. The selecting circuit 7 also receives an output from the data length specifying circuit 4. One input of the selecting circuit 7 receives an output of the controlling circuit 6 to carry out a switching operation so that the selecting circuit 7 may select one of the inputs and provide the selected one to a central processing unit 10.

Figure 1:
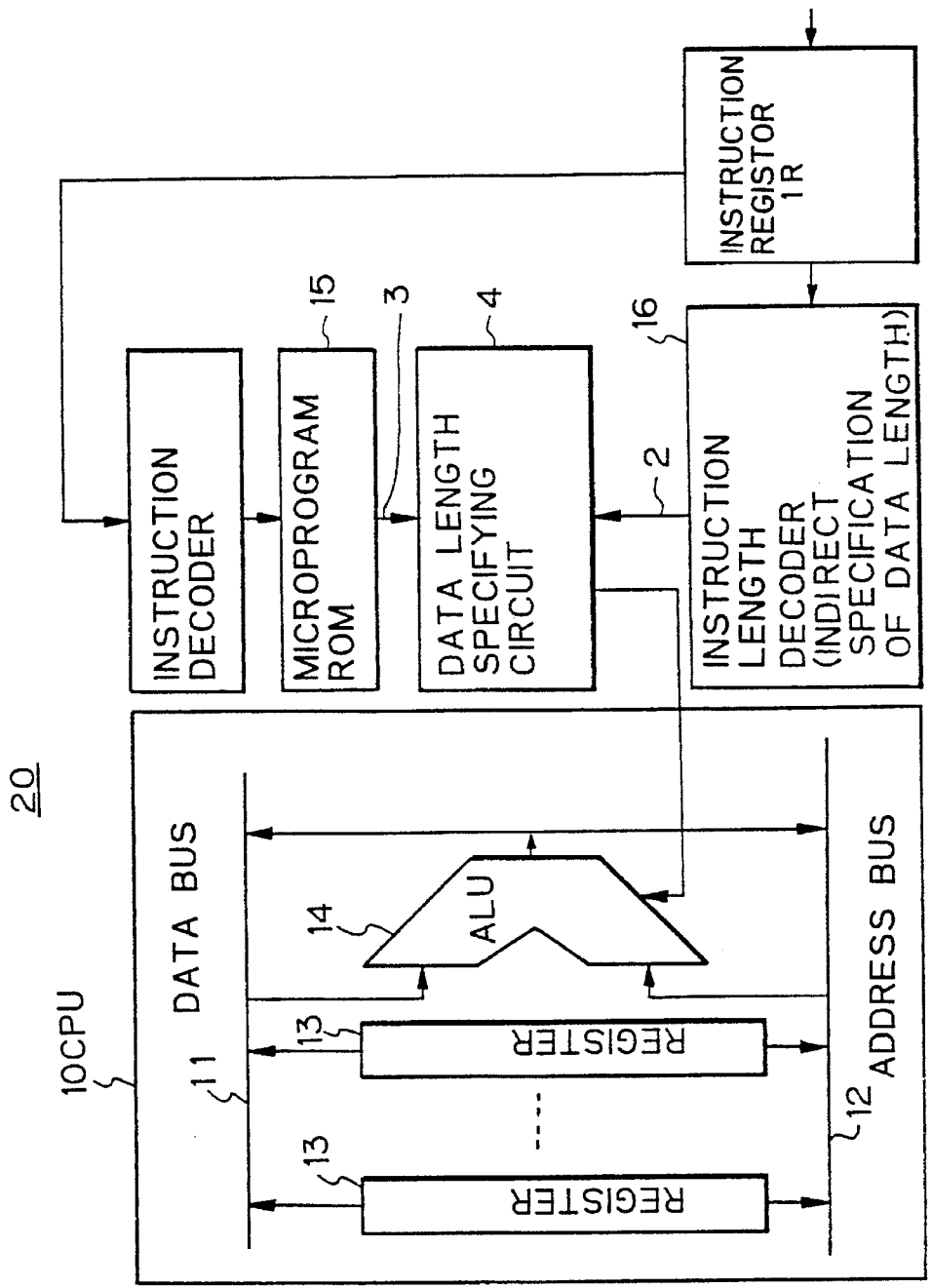
FIG. 1 is a view showing an information processing apparatus according to a prior art.
Figure 4:
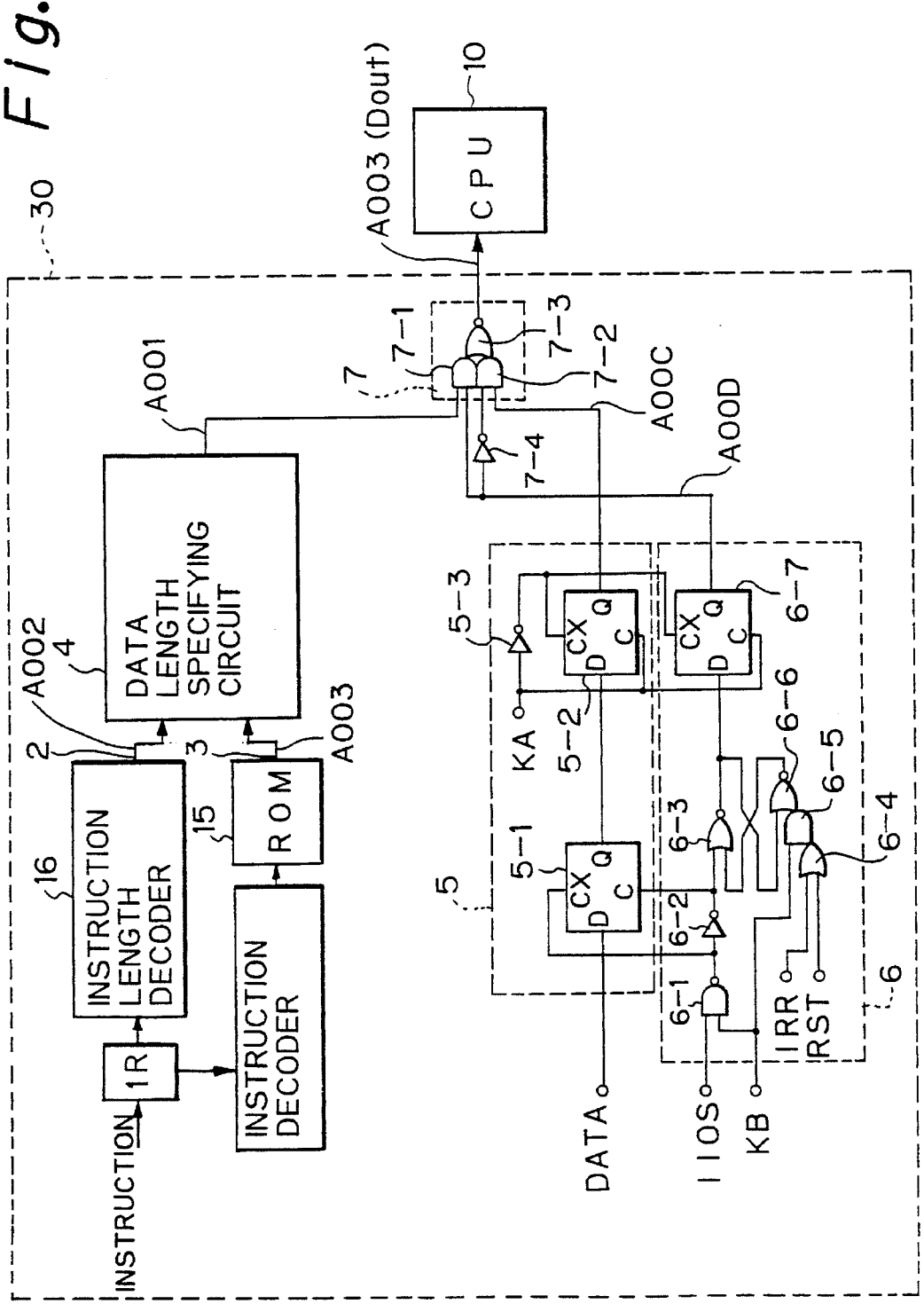
FIG. 4 is a circuit diagram showing a data length deciding circuit according to the present invention.

FIG. 4 shows an embodiment of a data length deciding circuit 30. In FIG. 4, parts corresponding to those of FIG. 2 are represented with like reference marks. In FIG. 4, the data length deciding circuit 30 has a conventional data length specifying circuit 4. This data length specifying circuit 4 is the same as that of FIG. 1, and receives an indirectly specified data length output 2 (A002) from a decoder 16, as well as a directly specified data length output 3 (A003) from a microprogram ROM 15. The data length specifying circuit 4 is connected to a selecting circuit 7, and provides the selecting circuit 7 with a data length specifying signal (A001) according to an instruction.

The data length deciding circuit 30 also has a data length information storing circuit 5 of one to several bits for storing data length information. The storing circuit 5 comprises latches 5-1 and 5-2, and an inverter 5-3. An input D of the latch 5-1 receives a data length input DATA, and the inverter 5-3 receives a clock signal KA. The latch 5-2 stores (half-state-latches) the data length information and outputs a data length indication bit (A00C) to the selecting circuit 7.

The data length deciding circuit 30 further has a controlling circuit 6. The controlling circuit 6 includes a storing element of one to several bits for selecting a method of specifying data length information. The controlling circuit 6 comprises a NAND gate 6-1, an inverter 6-2, a NOR gate 6-3, an OR gate 6-4, an AND gate 6-5, a NOR gate 6—6, and a latch 6-7. One input of the NAND gate 6-1 is connected to an input/output portion 6-8 which receives an instruction execution indication signal such as an IIOS, and the other input of NAND gate 6-1 receives a clock signal KB. The clock signals KB and KA are non-overlapping clock signals. One input of the OR gate 6-4 forms a stop portion 6-9 for receiving an instruction end indication signal such as a signal IRR, and the other input of the OR gate 6-4 receives a reset signal RST. The latch 6-7 stores (half-state-latches), for example, the instruction execution indication signal IIOS, and outputs a specifying method selecting signal (A00D).

In this embodiment, the data length information storing circuit 5 has the latch circuits 5-1 and 5-2. This arrangement is suitable when data length information for an instruction that is not included in the microprograms is represented by 1 or 0 (for example, 1 for 16-bit length and 0 for eight-bit length). When a more complicated data length is employed, a combination of a plurality of latch circuits may be employed. The reason why the invention provides the storing circuit 5 is because, when an instruction which is not included in the microprograms is repeatedly executed, it is troublesome to read data each time. To solve this, the data is stored in the storing circuit 5 and repeatedly used.

An input portion 5-4 of the storing circuit 5 is connected to a storage unit (numeral 9 of FIG. 3) such as a table for storing data length information (data) necessary for executing other processes that cannot be handled by the original microprograms. When the input/output portion 6-8 receives the signal IIOS, the controlling circuit 6 is actuated to let the storing circuit 5 read data out of the storage unit (table) and store the data in the latch circuits 5-1 and 5-2.

When the output A00D of the controlling circuit 6 is provided to the selecting circuit 7, the storing circuit 5 provides the selecting circuit 7 with a data length output A00C. If the output signal of the controlling circuit 6 is of level L in FIG. 4, the selecting circuit 7 cuts the output A001 of the data length specifying circuit 4 while selecting the output of the storing circuit 5, and outputs the selected one to a central processing unit 10.

When the output of the controlling circuit 6 is switched to level H, the selecting circuit 7 cuts the output of the storing circuit 5, and again selects the output of the data length specifying circuit 4 to output the selected one to the central processing unit 10.

An example of the selecting circuit 7 of the invention will now be explained. The selecting circuit 7 comprises two AND gates 7-1 and 7-2, and a NOR gate 7-3. The first AND gate 7-1 receives the output A001 of the data length specifying circuit 4 as well as the output A00D of the controlling circuit 6. The output of the AND gate 7-1 is connected to one input of the NOR gate 7-3. The second AND gate 7-2 receives the output A00C of the storing circuit 5 and the output A00D of the controlling circuit 6 through an inverter 7-4. The output of the AND gate 7-2 is connected to the other input of the NOR gate 7-3. The output of the NOR gate 7-3 is an output $D_{out}$ of the selecting circuit 7.

An operation of the data length deciding circuit of FIG. 4 will be explained next with reference to FIG. 5.

The instruction execution indication signal IIOS indicates the execution of a process that is not included in original instruction codes.

It is supposed that the clocks KA and KB are provided at the timing shown in the figure, that the directly specified output A003 and indirectly specified output A002 are provided as shown in the figure, and that only one of the outputs A002 and A003 is selected by the data length specifying circuit 4 and provided to the CPU 10.

When the instruction execution indication signal IIOS becomes "1" at time T1, an output A00F of the NOR gate 6-3 of the controlling circuit 6 changes from "1" to "0" at time T2 according to the first clock KB generated after the time T1. In response to this change, the output A00D of the latch circuit 6-7 changes from "1" to "0" at time T3 according to the clock KA.

Since the instruction execution indication signal IIOS is "1," a flip-flop (formed by the NOR gate 6-3, OR gate 6-4, AND gate 6-5, and NOR gate 6—6) of the controlling circuit 6 changes to "0" in response to the clock signal KA. Namely, the controlling circuit 6 stores "0." As a result, the output A00D of the latch 6-7 is "0" so that the value A00C latched in the latch 5-2 of the data length information storing circuit 5 is selected by the selecting circuit 7 and provided as the output A003 to the CPU 10.

When the instruction end indication signal IRR or the reset signal RST is provided when the value A00D of the latch 6-7 is "0," the value of the flip-flop (6-3 to 6—6) returns to "1" because the instruction execution indication signal IIOS has returned to "0." As a result, the value A00D of the latch 6-7 becomes "1." The selecting circuit 7 then selects the output A001 of the data length specifying circuit 4 and provides the selected one as the output A003 to the CPU 10.

On the other hand, the data length information input DATA is latched in the two stages of the latches 5-1 and 5-2 in response to the clock signal KB. The output A00B of the latch circuit 5-1 changes at time T2' slightly after the time T2, and the output A00C of the latch circuit 5-2 changes at time T4 when the next clock pulse KB occurs.

Namely, at the time T3, the selecting circuit 7 is switched, and at the time T4, the output of the storing circuit 5 is sent as the output A003 to the CPU 10.

At time T5, the end signal IRR is provided to the stop portion 6-9, and the output of the NOR gate 6-3 changes from "0" to "1" at time T6 in response to the clock pulse KB. At time T7, the output A00D of the latch circuit 6-7 changes from "0" to "1." As a result, the selecting circuit 7 is switched to send the output A001 of the data length specifying circuit 4 to the CPU 10.

Figure 5:
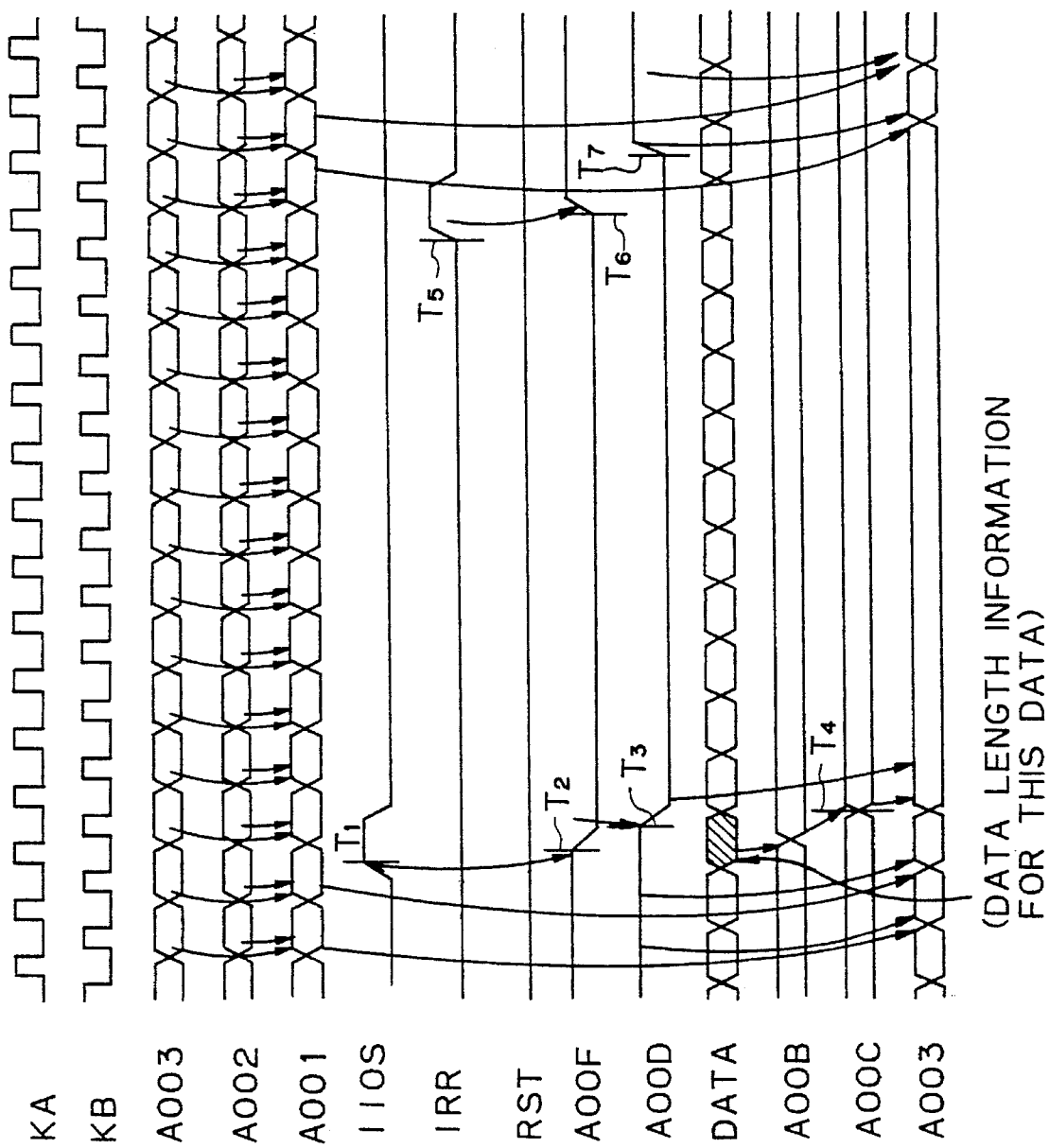
FIG. 5 is a time chart showing operations of respective parts of the circuit of FIG. 4.

In FIG. 5, a period X between T3 and T7 is the period for executing the process IIOS, where a data length necessary for executing an instruction not included in the microprograms is specified. The process is a sort of interrupt process. During this period, an operation is executed according to the information of the signal A00C based on the input DATA. During a period other than the period X, a process is carried out according to the output A001 of the data length specifying circuit 4.

The above embodiments relate to deciding a data length. The present invention is also applicable for deciding a transferring data length and the data length of an incrementer or of a decrementer.

In this way, according to the above embodiments, the data length specifying circuit 4 can indirectly specify a data length so that two instructions which perform the same operation but with different data lengths can be described by a single microprogram. Even for a process such as an interrupt process whose data length cannot be specified with a special instruction code, the invention can decide the data length by the use of the controlling circuit 6, which switches the normal data length specifying mode to a different data specifying mode to take data length information out of the data length information storing element 5. Unlike the conventional circuit, it is not necessary to use an ALU, etc., to check data length information stored in a storing unit and branch microprograms. The invention does not use microprograms frequently, thereby reducing the size of the microprogram ROM 15.

The controlling circuit 6 may have a storage capacity of one bit (or several bits), so that it may be realized with less hardware.

As described above, according to the present invention, two or more instructions having different data lengths can be described by a single microprogram, thereby reducing the size of a microprogram ROM.

I claim:

1. An information processing apparatus for processing information utilizing a plurality of instructions having different data lengths by use of microprogram after judging first data length information related to each for the instructions according to either a method of indirectly specifying the first data length information or a method of directly specifying the first data length information in the microprogram, comprising:

a data length specifying means for specifying one of either the directly specified data length information or indirectly specified data length information;

a storing means for storing second data length information dedicated to an interrupt process;

a controlling means for controlling the storing means; and a selecting means for selecting the output of either the data length specifying means or the storing means.

2. An information processing apparatus as set forth in claim 1, wherein information to be stored in the storing means is read out from an external information storing unit that is different from the storing means in response to an operation of the controlling means, and is stored in the storing means.

3. An information processing apparatus as set forth in claim 2, wherein the controlling means comprises an input/output portion for transferring predetermined data length information from the external information storing unit to the storing means and for providing the selecting means with the information stored in the storing means, and a stop portion for stopping the provision of the information to the selecting means.

4. An information processing apparatus as set forth in claim 1, wherein the selecting means selects either one of the outputs of the data length specifying means or the storing means in response to an output of the controlling means, and outputs the selected output.

* * * * *